United States Patent [19]
Komine et al.

[11] Patent Number: 5,852,466
[45] Date of Patent: Dec. 22, 1998

[54] TELECONFERENCE SYSTEM

[75] Inventors: Takayuki Komine, Kawasaki; Hisashi Kawai, Yokohama, both of Japan

[73] Assignee: Canon Kabushiki Kaisha, Tokyo, Japan

[21] Appl. No.: 599,666

[22] Filed: Feb. 12, 1996

Related U.S. Application Data

[63] Continuation of Ser. No. 174,434, Dec. 28, 1993, abandoned.

[30] Foreign Application Priority Data

Dec. 28, 1992 [JP] Japan .................................. 4-361627
Jan. 29, 1993 [JP] Japan .................................. 5-034926

[51] Int. Cl.$^6$ .................................................. H04N 7/15
[52] U.S. Cl. .......................... 348/15; 379/202; 370/261; 370/260
[58] Field of Search ................................. 348/15, 14, 16, 348/17; 379/202, 203, 204, 205, 206, 93, 94, 96, 97, 98, 100, 132, 93.21, 93.17, 93.23, 93.14; 370/260, 261, 262; H04N 7/15

[56] References Cited

U.S. PATENT DOCUMENTS

| | | |
|---|---|---|
| 4,823,376 | 4/1989 | Takahashi .............................. 379/132 |
| 4,870,677 | 9/1989 | Di Santo et al. ......................... 379/96 |
| 5,031,208 | 7/1991 | Kawashima ............................. 379/100 |
| 5,065,393 | 11/1991 | Sibbitt et al. ............................. 370/62 |
| 5,216,517 | 6/1993 | Kinoshita et al. ...................... 379/100 |
| 5,323,445 | 6/1994 | Nakatsuka .................................. 348/15 |
| 5,530,472 | 6/1996 | Bregman et al. .......................... 348/15 |
| 5,541,639 | 7/1996 | Taktsuki et al. ........................... 348/15 |

FOREIGN PATENT DOCUMENTS 0208066 8/1989 Japan ...................................... 379/53

*Primary Examiner*—Stella Woo
*Attorney, Agent, or Firm*—Fitzpatrick, Cella, Harper & Scinto

[57] ABSTRACT

A teleconference system by which a reservation for use can be readily and certainly established. The teleconference system includes an input unit for inputting image data and audio data; an output unit for outputting image data and audio data; a communication unit for multiplexing the image data and the audio data; a reservation management unit for controlling a reservation time at which the teleconference system is used and for allowing a reservation partner to use the teleconference system when the reservation time has come; and an interface unit for connecting with an external device. The reservation management unit performs a reservation control of a teleconference system based on reservation information sent from the external device via the interface unit.

19 Claims, 8 Drawing Sheets

TELECONFERENCE SYSTEM

This application is a continuation of application Ser. No. 08/174,434 filed Dec. 28, 1993, now abandoned.

BACKGROUND OF THE INVENTION

1. Field of the Invention

The present invention relates to a teleconference system where attendants can hold a conference together with attendants who are at a remote location with the help of video screens, loudspeakers or the like, and more particularly to a teleconference system that can accept a reservation for the use thereof.

2. Related Background Art

FIG. 8 is a block diagram showing the configuration of a conventional teleconference system. A codec circuit 14 is connected to a camera 10 for taking the image of an attendant, a microphone 11 receives the voice of an attendant, a monitor 12 displays the image of an opposite attendant, and a loudspeaker 13 for reproduces the voice of an opposite attendant. The codec circuit 14 also compresses an image signal from the camera 10 and an audio signal from the microphone 11, expands the compressed image signal and the compressed audio signal from an opposite teleconference system 17, and outputs the results to the monitor 12 and the loudspeaker 13, respectively. The codec circuit 14 is connected to a terminal adaptor 15 which is connected to the opposite teleconference system 17 via a conventional circuit 16. The terminal adaptor 15 also performs an interfacing process between the codec circuit 14 and the conventional circuit 16.

In such a conventional teleconference system, the codec circuit 14 receives the image of an attendant taken by the camera 10 and the voice of the attendant gathered by the microphone 11. The terminal adaptor 15 outputs the compressed data to the opposite teleconference system 17 at a remote place via the conventional circuit 16. The codec circuit 14 receives the compressed image signal and audio signal of the opposite attendant which are input to the terminal adaptor 15 via the conventional circuit 16. Then to expanded image signal is displayed on the monitor 12. The expanded audio signal is output to the loudspeaker 13. The opposite teleconference system 17 receives the image signal and the audio signal mentioned above to expand them. The image signal is displayed on the monitor 12 and the audio signal is output to the loudspeaker 13.

In the conventional teleconference system, information such as dial numbers, addresses and comments of plural communication partners are pre-registered. When the teleconference system is used, the menu including line numbers related to registration is displayed Selecting a specific communication partner in the menu allows an automatic originating call based on the selected line number.

However, the teleconference system cannot make a reservation for a use thereof. For example, a partner cannot sometimes use the teleconference system at a desired time if another partner makes a line connection immediately before the partner wants to use the teleconference system.

In order to cope with the problem, it may be considered of course to prepare a reservation function to the teleconference system.

However, there is a disadvantage in that a reservation cannot be made for the teleconference system in the case where there is no time to go to the teleconference system installing spot for a reservation registration, or there is no person to ask for a reservation registration because a schedule is very tight until the date and time desired to use the teleconference system.

Also there is a disadvantage in that even if a partner tries to make a reservation registration, the teleconference system cannot be used at his reservation time because of an interruption from another teleconference system.

Moreover, because the completion time of a reserved conference is unclear to the attendants, the teleconference system is sometimes switched to another reservation partner before a conclusion of a subject at the conference comes to an end.

SUMMARY OF THE INVENTION

In order to overcome the above mentioned various problems, an object of the present invention is to provide a teleconference system by which a reservation for use can be readily and certainly made thus being easy to use.

Another object of the present invention is to provide a teleconference system where a teleconference can be reserved by an external device connected via an interface, whereby a reservation registration can be made from a remote location without coming to the spot where the teleconference system is installed.

Still another object of the present invention is to provide a teleconference system that allows a reservation partner to use certainly the system at a reservation time, by inhibiting other partners other than a reservation partner from using the system when the reservation time has arrived.

It is another object of the present invention to provide a teleconference system that can be effectively utilized by allowing other partners to use the system when the reservation partner does not use the reservation in a predetermined period of time after the reservation time.

Further, it is another object of the present invention to provide a teleconference system in which communication preparations can be made to execute an automatic line connection at a predetermined date and time or to execute a line connection with one touch operation.

A still further object of the present invention is to provide a teleconference system where an attendant can manage the progress of a conference call by informing other attendants of the remaining usable period of the teleconference system.

These and the other objects of the present invention will become apparent from the following drawing and detailed description take in connection with the drawings.

DESCRIPTION OF THE PREFERRED EMBODIMENTS

First Embodiment

Figure 1:
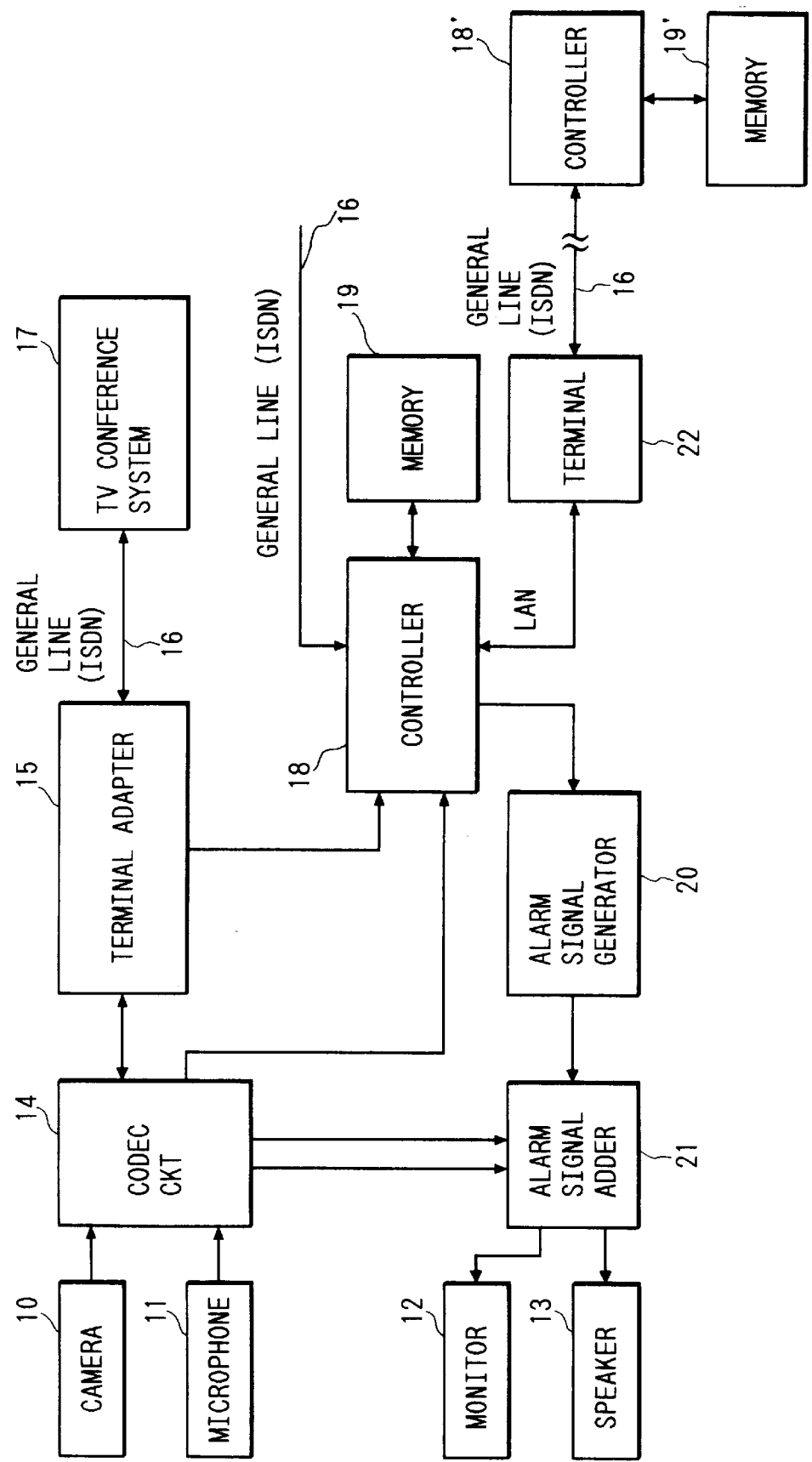
FIG. 1 is a structural block diagram showing a teleconference system according to a first embodiment of the present invention.

An explanation will be given below for an embodiment according to the present invention with reference to the attached drawings. FIG. 1 is a block diagram showing the configuration of the present embodiment. Like numerals are attached to like elements previously described with respect to FIG. 8.

Figure 8:
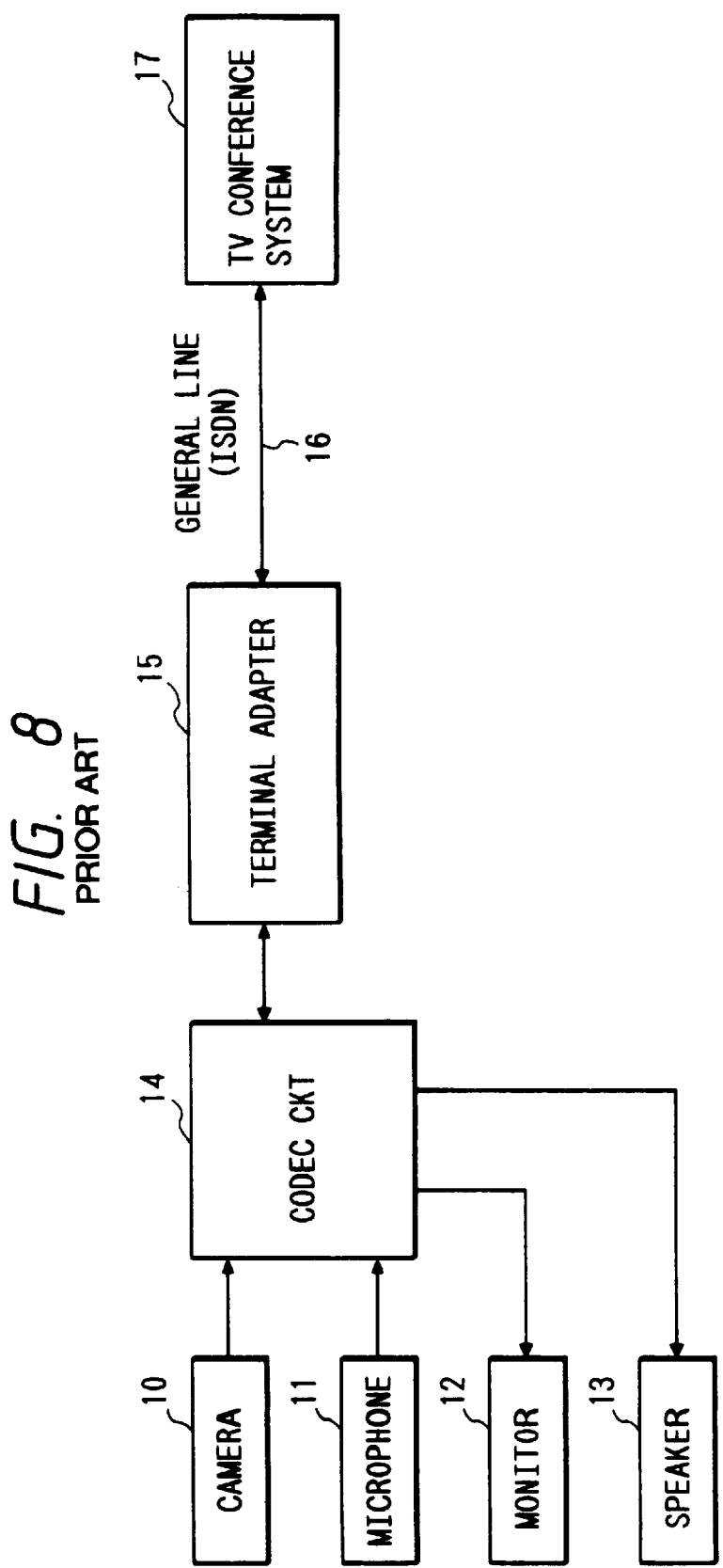
FIG. 8 is a structural block diagram showing a conventional teleconference system.

According to the present embodiment, as shown in FIG. 1, a controller 18, a memory device 19, an alarm signal generator 20 and an alarm signal adder 21 are added to the teleconference system shown in previously described FIG. 8. The controller 18 is connected to a general line 16, a terminal adaptor 15, the codec circuit 14 and the alarm signal generator 20. In the present embodiment, the terminal device 22 is connected to the controller 18, together with a general line such as and integrated services digital network (ISDN) or a local line such as a local area network (LAN). The alarm signal adder 21 is connected to the alarm signal generator 20, the monitor 21, the loudspeaker 13, and the codec circuit 14.

The memory device 19 stores a use schedule table (reservation table) of the teleconference system. The controller 18 monitors the operations of the codec circuit 14 and the terminal adaptor 15. The controller 18 also rewrites the reservation table in the memory device 19 based on a request from the terminal device 22 on reservation registration, reservation retrieving, and cancellation of the teleconference system, and provides to the alarm signal generator 20 an alarm signal indicating that the following reservation time is drawing near. The alarm signal generator 20 produces an alarm signal in response to an alarm signal from the controller 18. The alarm signal adder 21 convolves a message indicating an approach of the following reservation time to an image signal and an audio signal output from the codec circuit 14 in response to an alarm signal to output the result to the monitor 12 and the loudspeaker 13.

The operation of the present embodiment will be described below. The basic operation of the teleconference system according to the present embodiment resembles the conventional teleconference system. A unique operation of the present embodiment will be described below.

Conference Reservation

A reservation partner for the teleconference system first uses a telephone to a controller 18' of a teleconference system at a desired remote location via the terminal device 22 to request the data transmission of a reservation table. In response to the request, the controller 18' transmits the reservation table of the teleconference system read out of a memory device 19' to transmit the data in the reservation table to the terminal device 22. The controller 18 of the teleconference system is connected to the teleconference system of the reservation partner via the local line such as LAN. The terminal device 22 also requests the controller 18 of the teleconference system to transmit data on the reservation table via a local line such as LAN. The controller 18 transmits data in the reservation table of the teleconference system read out of the memory device 19 to the terminal device 22 on the requesting side via the local line. The controller 18' and the memory device 19' are arranged in the teleconference system 17.

The terminal device 22 of the reservation partner displays both the schedule table sent from the remote teleconference system and the schedule table sent from the teleconference system connected to the local line on the monitor screen, and selects as a teleconference time a desired date, time and time period from unscheduled dates and time periods. The terminal device 22 inputs data including the selected use date, time, time period, and the reservation partner's name and section.

The controller 18' of each teleconference system receives the teleconference reservation message sent from the terminal device 22 and additionally stores the same to the schedule table stored in the memory device 19'. Then the memory device 19' transmits a reservation completion message to the terminal device 22. The reservation partner confirms the completed reservation by the return message to select a completion command, thus disconnecting the line from the controller 18' to complete the reservation procedure.

Alarm Time Setting

Before starting a conference, the user of the teleconference system sets an alarm producing time to a time preceding a reservation completion time. In particular, the codec circuit 14 provides a reservation table data request signal to the controller 18. The controller 18 outputs that data on the reservation table read out of the memory device 19 in response to the request signal to the codec circuit 14. The codec circuit 14 sends the data on the reservation table to the monitor 12 via the alarm signal adder 21 to display it on the monitor 12. At this time, since the alarm signal generator 20 does not output an alarm signal, both the image signal and the audio signal from the codec circuit 14 are respectively manifested on the monitor 12 and by the loudspeaker 13 without any change.

The user of the teleconference system confirms a conference completion time with reference to the data on the reservation table displayed on the monitor 12, thus setting an alarm operation time. The codec circuit 14 sends the input alarm operation time to the controller 18 for storage in an internal memory area of the controller 18.

Alarm Operation

The controller 18 compares the current time with the alarm operation time stored in the internal memory area. When the current time corresponds to the alarm operation time, the controller 18 outputs an alarm command signal to the alarm signal generator 20 which outputs it to the alarm signal adder 21. In response to the alarm signal, the alarm signal adder 21 convolves the image signal and the audio signal from the codec circuit 14 with a message warning about the approach of the following reservation time to output the result to the monitor 12 and the loudspeaker 13. For example, a message saying "The remaining time for the conference is 30 minutes" is on the lower portion of the screen of the monitor 12 while the loudspeaker 13 produces an alarm sound such as a chime.

The teleconference system 17 includes the codec circuit 14, the alarm signal generator 20, and the alarm signal adder 21. When the controller 18 recognizes that the alarm operation time has arrived, it informs the teleconference system 17 of that fact. This process allows the teleconference system 17 to produce the message display and alarm sound. Since the chairperson hears the alarm sound and confirms the message on the monitor 12, he can adjust the progress of the conference so as to finish in the remaining time, thus effectively holding the conference in a scheduled period of time.

For the embodiment, a description has been given for the case where a general line is linked to both the controller 18 and the terminal device 22. However, it is possible to connect the general line only to the terminal device 22. In this case, a reservation partner of the teleconference system makes a telephone call from his terminal device 22 to the terminal device of a partner in charge at a remote location to arrange in advance the open time of the remote teleconference system. Each partner in charge accesses the controller of each teleconference system to call the teleconference system reservation table. Then he selects a desired time from the unscheduled time period on the reservation table to make a teleconference system reservation.

In this state, the data of the retrieved reservation table, which are interchanged between the terminals, are shared by reservation partners and a partner in charge. They can compare and study the reservation schedule table to schedule the teleconference, by telephone to an open date and time which is a common unscheduled reservation date and time, thus registering a final reservation to each teleconference system. In this case, the date and time of the teleconference can be determined while the content of the reservation schedule table at hand is confirmed through a telephone line, without interchanging data on the reservation schedule table between the reservation partner and a partner in charge.

As described above, the present embodiment can provide a simple reservation for the teleconference system via a terminal device coupled to the general line and the LAN. The teleconference can be certainly held at a desired date and time because the alarm signal generator produces an alarm signal at a preset warning time.

The teleconference can be adjusted in progress and effectively held because a dispatch on the teleconference system is made to the self terminal and the opposite terminals based on the alarm signal and the attendants of the teleconference are informed of the remaining time of the conference. When there are plural subjects for discussion, a time setting can be made to each subject by different alarms.

Second Embodiment

Next the teleconference system according to the second embodiment will be described which can reserve a teleconference with a simpler operation and inhibit partners other than a reservation partner from using the same at a scheduled date.

Figure 2:
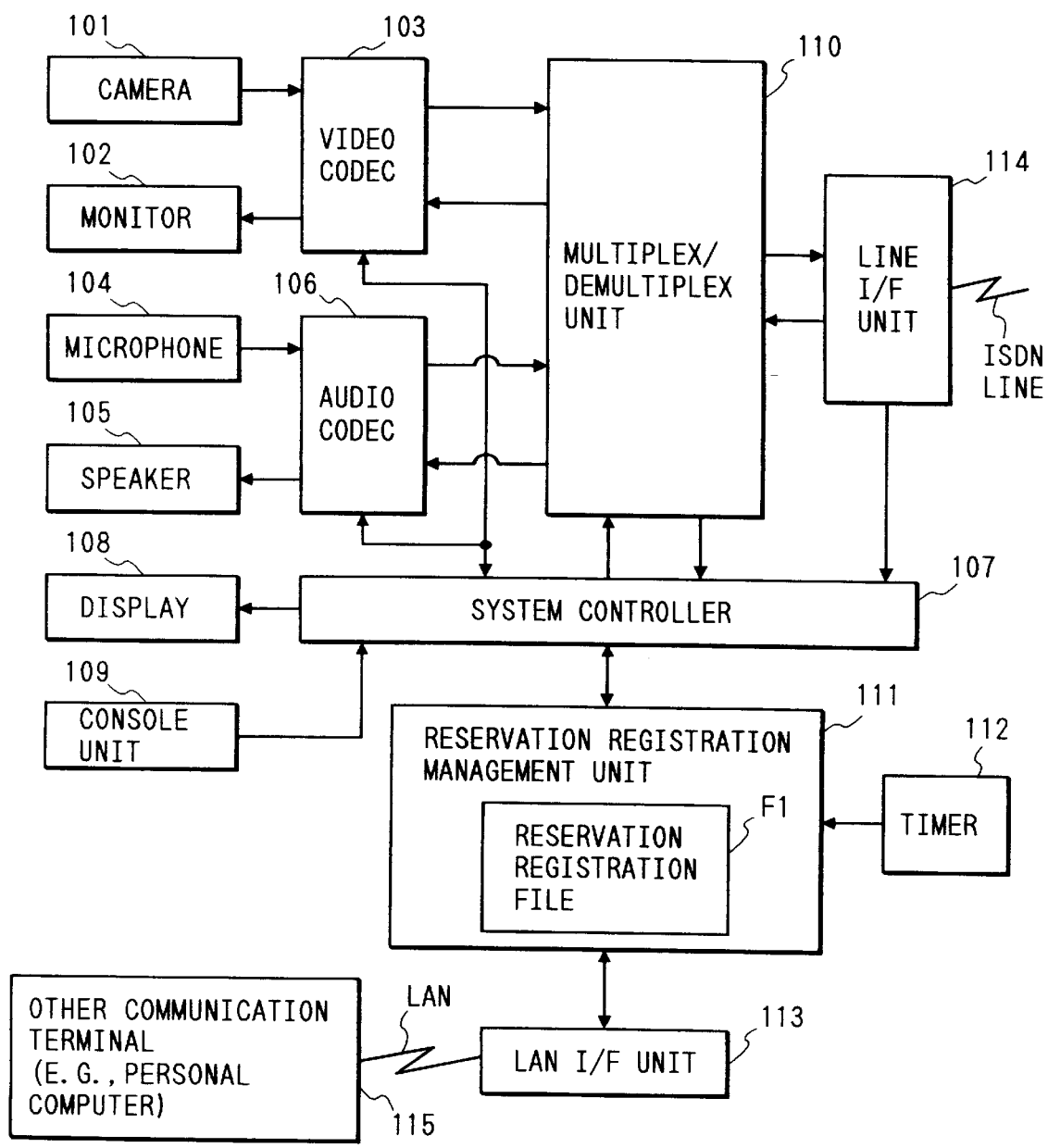
FIG. 2 is a structural block diagram showing a teleconference system according to a second embodiment of the present invention.

FIG. 2 is a block diagram showing the general configuration of the teleconference system according to the second embodiment.

A television camera 101 acts as image data input means to take an image of attendants. A monitor 102 displays the image data sent from the opposite terminal. A video codec 103 encodes image data taken by the television camera 101 to compress it and decodes the compressed image data to expand it. Numeral 104 represents a microphone and 105 represents a loudspeaker. The audio codec 106 decodes and compresses audio data received by the microphone 104 and expands by demultiplexing the compressed audio data. The audio codec 106 acts as a system controller to control the entire system.

A liquid crystal display 108 displays operational data. A console unit 109 inputs reservation information and manipulates operational commands. A multiplexer and demultiplexer 110 multiplexes and demultiplexes image data, audio date and data from a system controller 107. A reservation registration management unit 111 registers and controls the reservations for conferences. A timer 112 measures time. A LAN interface unit 113 communicates with other communication terminal devices such as personal computer 115 or another teleconference system via a local area network (hereinafter referred to LAN).

Furthermore, the multiplexer and demultiplexer 110 is coupled to an integrated services digital network (ISDN) via a line interface unit 114 which is coupled to the other teleconference systems. The reservation registration management unit 111 includes a reservation registration file F1 to register ID data of reservation partners, reservation dates (hereinafter referred to reservation period), and reservation partner's line numbers.

Next, the teleconference system according to the second embodiment will be described below with reference to FIG. 2. The video codec 103 encodes and compresses image data from the television camera 101. The audio codec 106 encodes and compresses audio data form the microphone 104. The multiplexer and demultiplexer 110 multiplexes the coded and compressed data as well as the data from the system controller 107 to transmit the result to a communication partner via the line interface unit 114.

In similar manner, a line interface unit 114 separates multiplexed data sent from a destination partner into image data and audio data encoded in the multiplexer and demultiplexer unit 110. The image codec 103 decodes the image data for display on the monitor 102. The audio codec 106 decodes the audio data for produce an audio sound from the loudspeaker 105.

The system controller 107 is connected to the external line via the line interface unit 114 to perform a data communication to a communication partner via the multiplexer and demultiplexer unit 110. The user of the teleconference system uses the liquid crystal display 108 and the console unit 109 to perform the user's ID data input and line connection and disconnection, thus making the reservation registrations.

Figure 3:
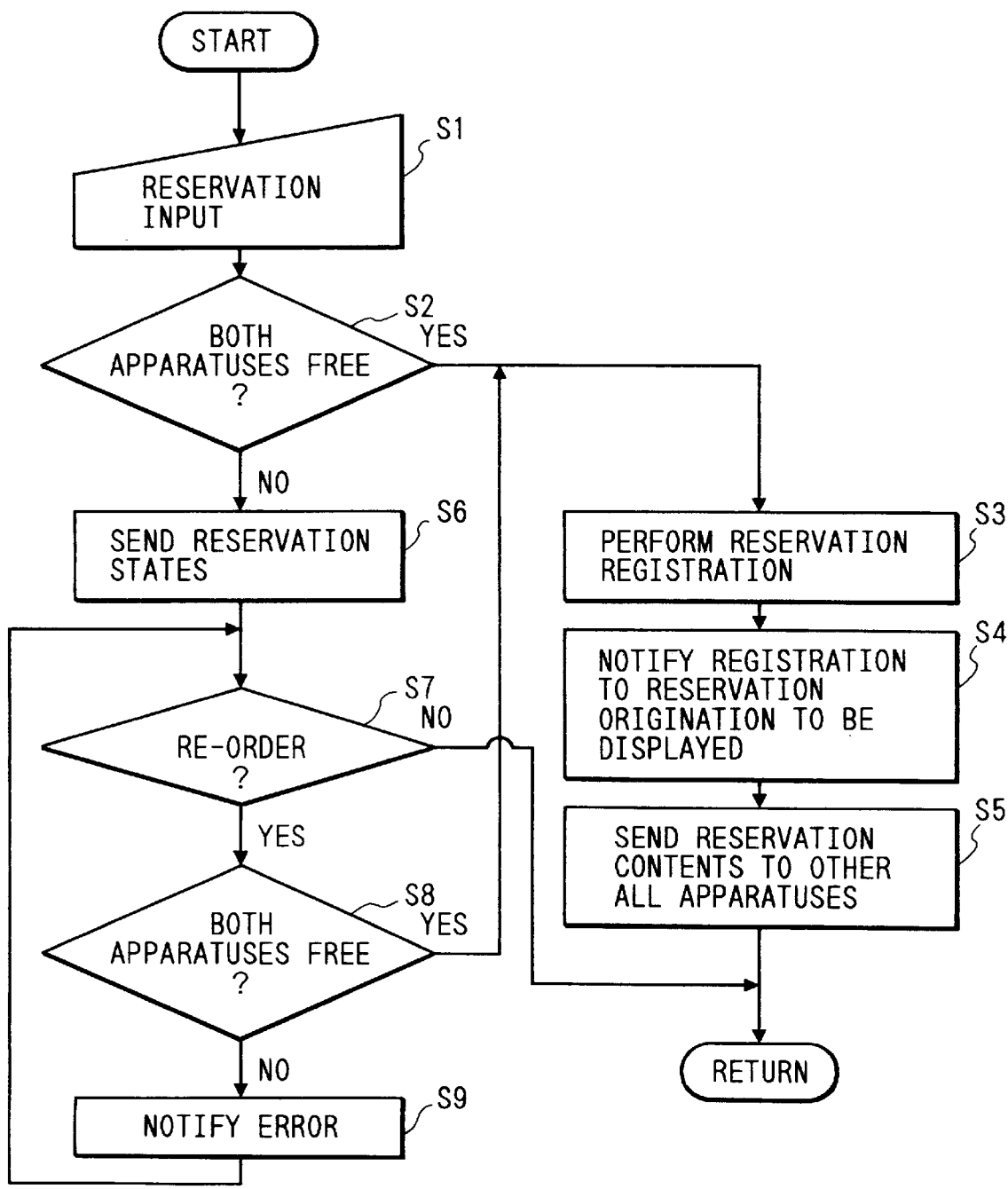
FIG. 3 is a flow chart showing a reservation registration operation.

Next, a description will be made for the reservation registration operation in accordance with the flow chart shown in FIG. 3.

The reservation registration management unit 111 processes various reservation registrations under control of the system controller 107. That is, the reservation registration management unit 111 receives a registration command from the console unit 109 of the self teleconference system and another communication terminal 115, together with a reservation applicant's ID data, a communication partner's line number and a reservation date and time (reservation period) (step S1). Thus the reservation registration management unit 111 refers to the reservation registration field F1 to judge whether the self device as well as the input related communication partner are in an empty state at the input reservation date and time (step S2). Questioning automatically to the opposite communication partner enables obtaining of the reservation state thereof.

As a result, if the self device and the input related opposite communication partner's device are empty at an input reservation date and time, the reservation content related to an application is additionally registered to the reservation registration file F1 (step S3). The fact that the registration has been completed is informed to the registration applicant to output on the self display (step S4). The process returns to the main flow after the reservation contents are transmitted to all the teleconference devices in the entire system (step S5). Each teleconference device which receives the registration content performs an addition registration to the reservation registration field F1 of the self deice. All updated reservation conditions in the system are registered in real time in the reservation registration fields F1 of all teleconference devices in the entire system.

If either the self device or the opposite communication partner's device is in a reserved state at an input reservation date, the content of the reservation registration field F1 is transmitted to the communication terminal device (including teleconference device) of the reservation applicant (step S6). Since the device on the reservation applicant side displays the received content of the reservation registration field F1, the reservation applicant can immediately re-order another empty date and time (period) or can re-order after another reservation date is agreed to by the opposite communication partner via a telephone line. When the re-order is immediately made with the line connected, it is necessary to input only a changed date but the ID data is input.

It is judged whether a re-order has been made in a predetermined period of time (step S7). If there has been a re-order in a predetermined period of time, it is judged whether both the self device and the opposite communication partner's device are empty at the reservation date (step S8). As a result, if both the devices are empty, the flow advances to the step S3 to perform a registration process. On the other hand, if it is judged that either one of the devices is not empty, error information is transmitted to the reservation applicant's device to display (step S9) and then the process returns to the step S7. In the step S7, if there is no re-order in a predetermined period of time, the process returns to the main flow.

Figure 4:
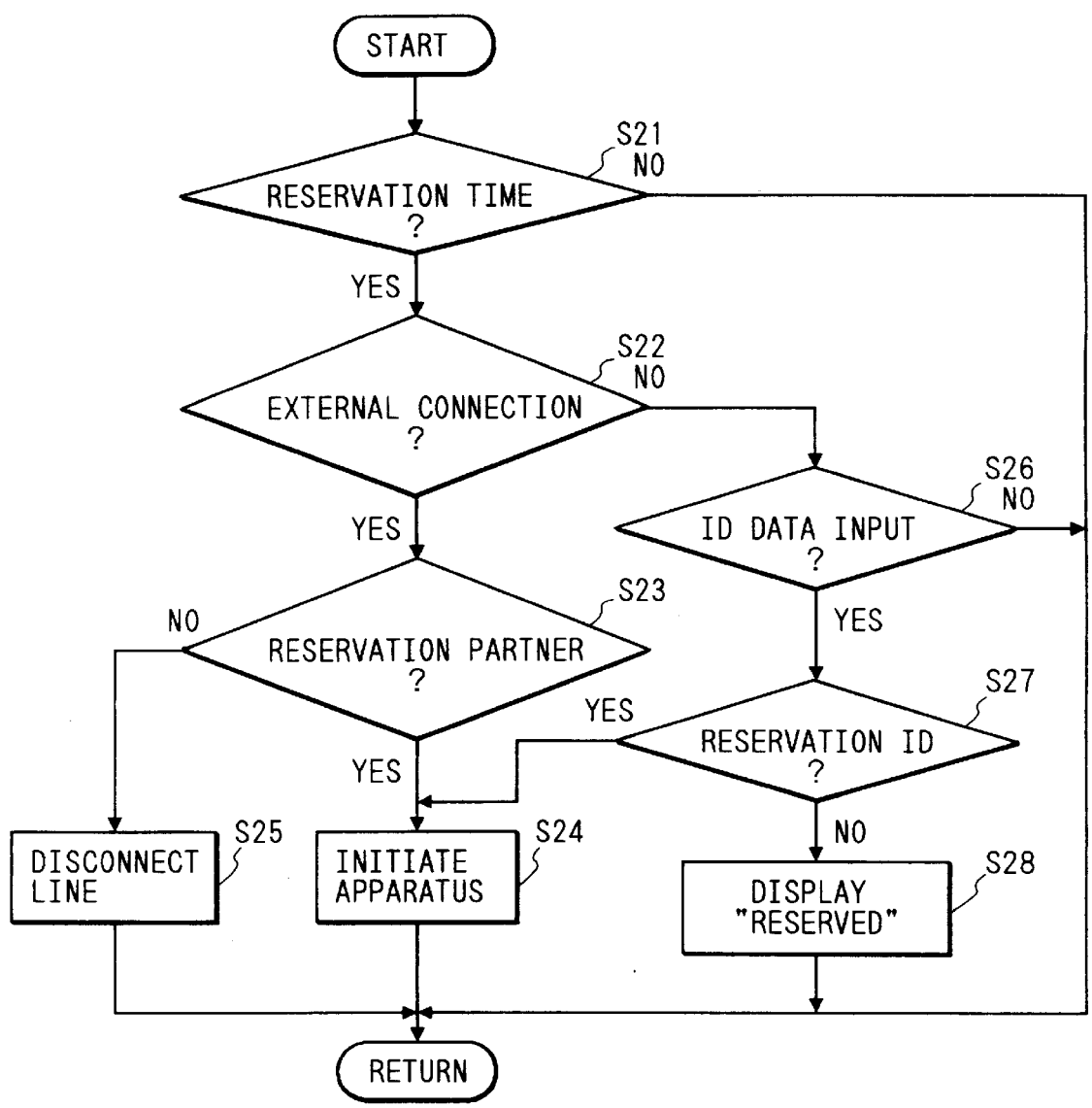
FIG. 4 is a flow chart showing a reservation registration operation.

Next, a description will be made for the reservation time management operation based on the flow chart shown in FIG. 4.

The system controller 107 judges whether the self device includes the reservations of which reservation dates have arrived according to the reservation registration field F1 and the timer 112 (step S21). As a result, if no corresponding reservations are found, the process returns to the main flow without any change. If the corresponding reservations are found, it is judged whether there are the externally connected lines (step S22). As a result, if there is a line connected to an external device, it is judged whether the external device is a reserved opposite communication party of which the reservation date is imminent (step S23). As a result, if the external device is the opposite communication partner's device which is related to the reservation date, the television camera 101 and the monitor 102 of the self device initiated for the teleconference (step S24). Then the process returns to the main flow. On the other hand, if the external device is not the opposite communication partner's device of which is related to the coming reservation date, it is informed that the system is in a reserved state so that the line is disconnected (step S25). Then the process returns to the main flow.

When it is judged that there is no line externally connected, it is judged whether ID data from the console unit 109 in the self device had been input (step S26). As a result, when there is no ID data input from the self device, the process returns to the main flow without any change. When there is ID data input from the self device, it is judged whether there is ID data corresponding to the reservation of which the reservation date has arrived (step S27). As a result, if there is ID data corresponding to the reservation of which the reservation date has arrived, the process goes to the step S24 to initiate the television camera 101 and the monitor 102 in the self device. On the other had, if there is no ID data corresponding to the reservation of which the reservation date has arrived, the display 108 displays that the system is in a reserved state (step S28) so that the process returns to the main flow.

According to the present embodiment, a reservation can be very conveniently made by a remote device via a LAN, without going to the location where a teleconference system is installed to make a reservation. If a user's ID data and an opposite communication partner's line number are reserved and registered, other communication partners can be inhibited from using the system during the reserved period of time, whereby only reservation partners can certainly use the teleconference system.

Third Embodiment

Next a description will be given for the third embodiment which can automatically prepare a conference when a reservation date has arrived. The third embodiment will be described with reference to FIGS. 5 to 7.

Figure 5:
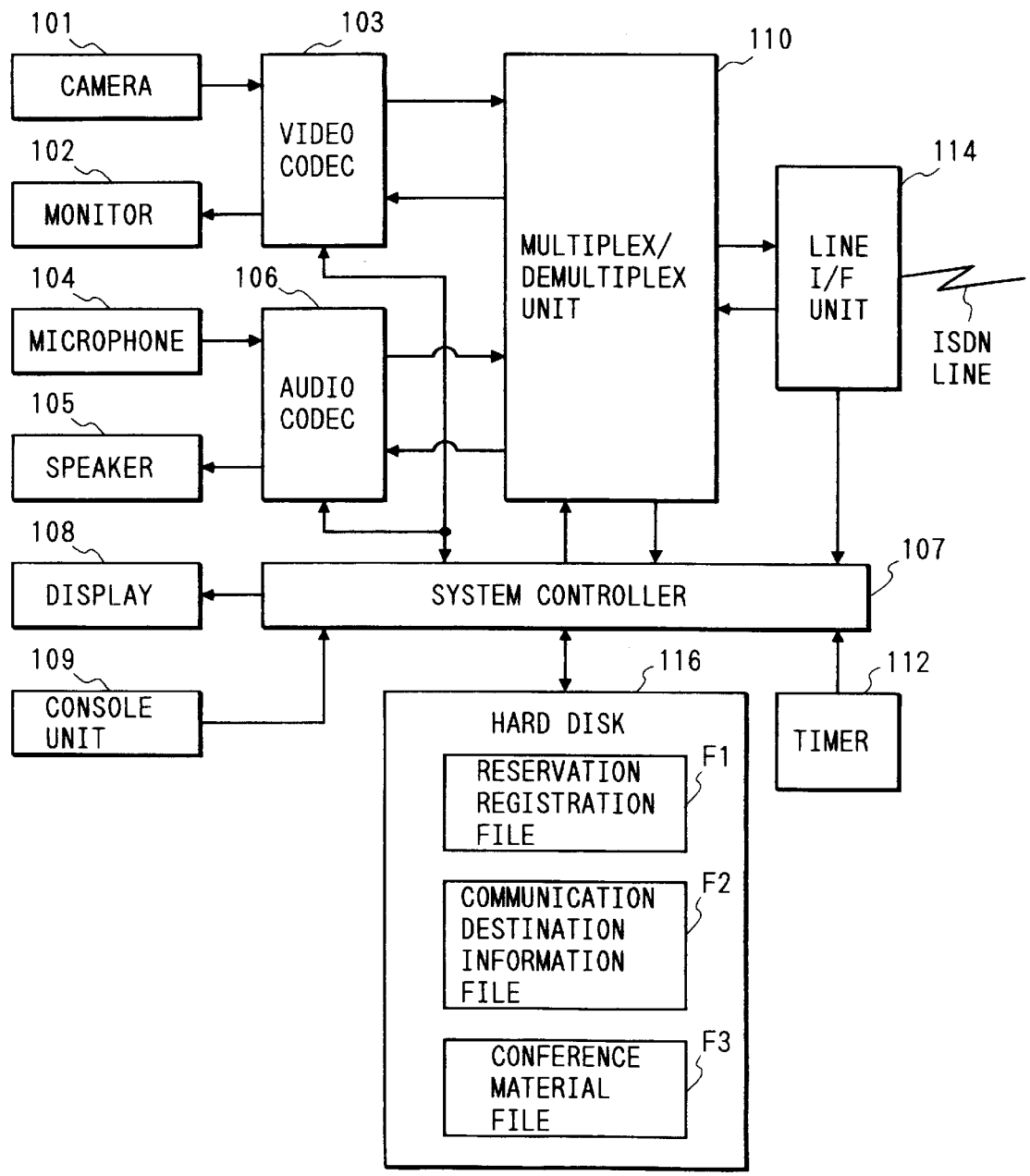
FIG. 5 is a structural block diagram showing a teleconference system according to a third embodiment of the present invention.

FIG. 5 is a block diagram showing the general configuration of the teleconference system according to the embodiment. Since the third embodiment is substantially similar to the second embodiment, the differences between them will be briefly described.

That is, the LAN interface unit 113 and the reservation registration management unit 111 in the second embodiment are not found in the third embodiment. However a hard disk 116 is newly added to store the registration of communication destination information and the use reservation data of the teleconference system. The hard disk 116 stores communication destination information file F2 including the line numbers, addresses and comments of communication destinations and the conference document file F3 including conference material data used in teleconferences, in addition to the reservation registration information file F1 in the second embodiment. Only the persons, which are authorized for utilization and of which the line numbers is recorded to the initial of the conference document file F3, can access the conference material F3.

Figure 6:
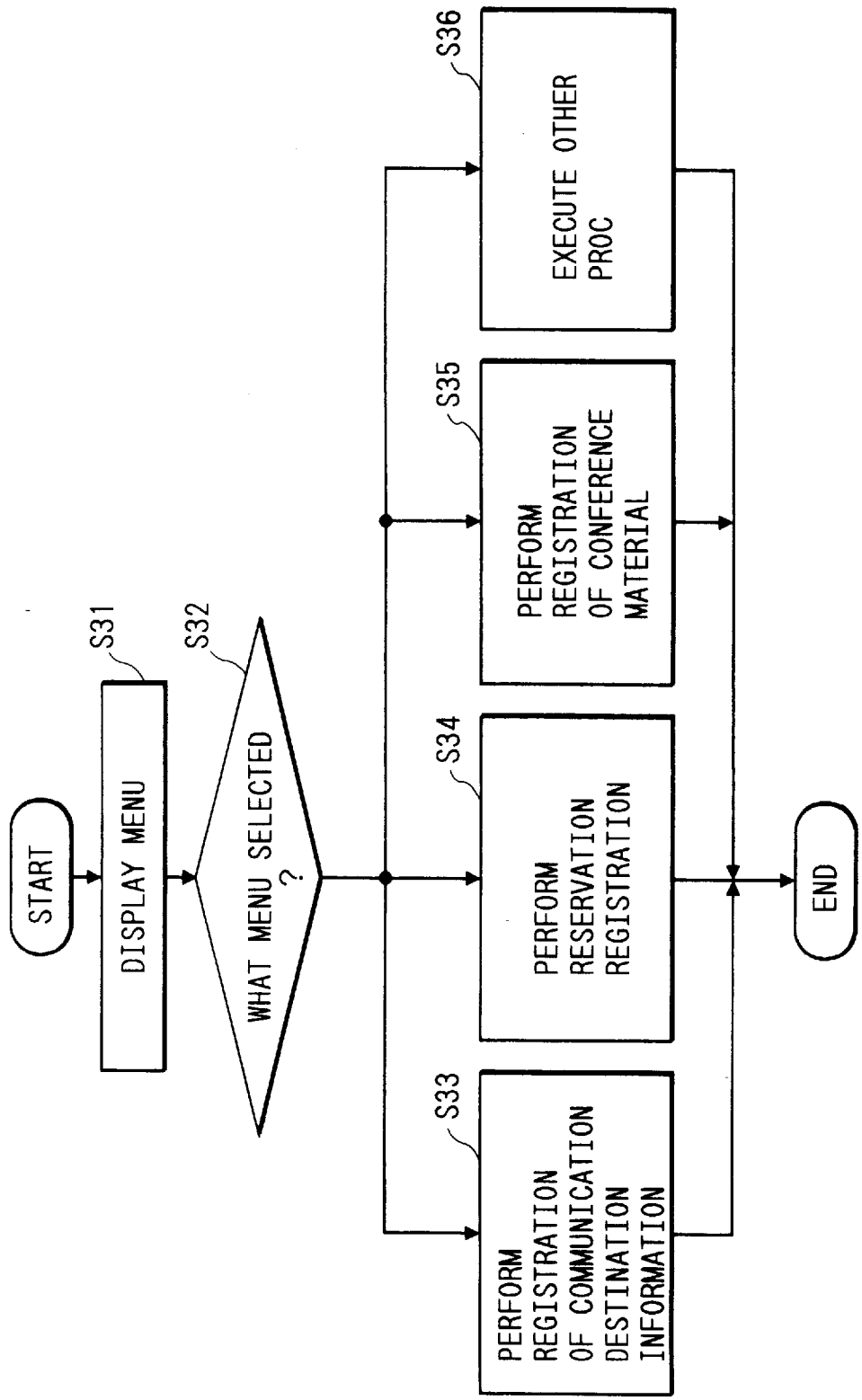
FIG. 6 is a flow chart showing a general operation of the third embodiment according to the present invention.

Next the general operation of the teleconference system according to the third embodiment will be described based on the flow chart shown in FIG. 6

When the system is activated, the system controller 107 first displays process items in a menu form on the display 108 (step S31). It is judged which menu item has been selected (step S32). As a result, when a communication destination information registration menu is selected, communication destination information such as the line number, address and comment of a communication destination input later is completely registered in the communication destination information file F2 (step S33). When a reservation information registration menu is selected, reserved partner's ID data reservation date, opposite communication partner or the like input later are completely registered in the reservation registration file F1 (step S34). When a conference material storage menu is selected, another process is completely performed in accordance with the selected menu (step S36).

When a transmission of conference document data is requested from an external device, the response is made only to the line numbers as transmission destinations that are attached to the conference document file regarding the transmission request, for other line numbers which are not attached, whereby the secret of the conference document data is kept.

An actual registration/storage process is performed by subjecting the following input content and operational content to a sequential guidance display in a conversational mode. When reservation information is registered, the contents of the reservation registration file F1 are displayed from beginning to end. When an empty time is selected from the file F1, the contents of the communication destination information file F2 is displayed to select an opposite communication partner. Then a guidance display is performed so as to input a reserved applicant's ID data. When the reserved applicant's ID data is input, the guidance display is selectively performed so as to establish an automatic line connection to a reserved opposite communication partner or a line connection by a one-touch operation when a reservation time has come. When either one of the line connections is selected, the currently input and registered reservation information is transmitted to all the teleconference devices in the system. The registration from the self device has already been performed to the reservation registration file F1 in response to the selection and input operation.

Figure 7:
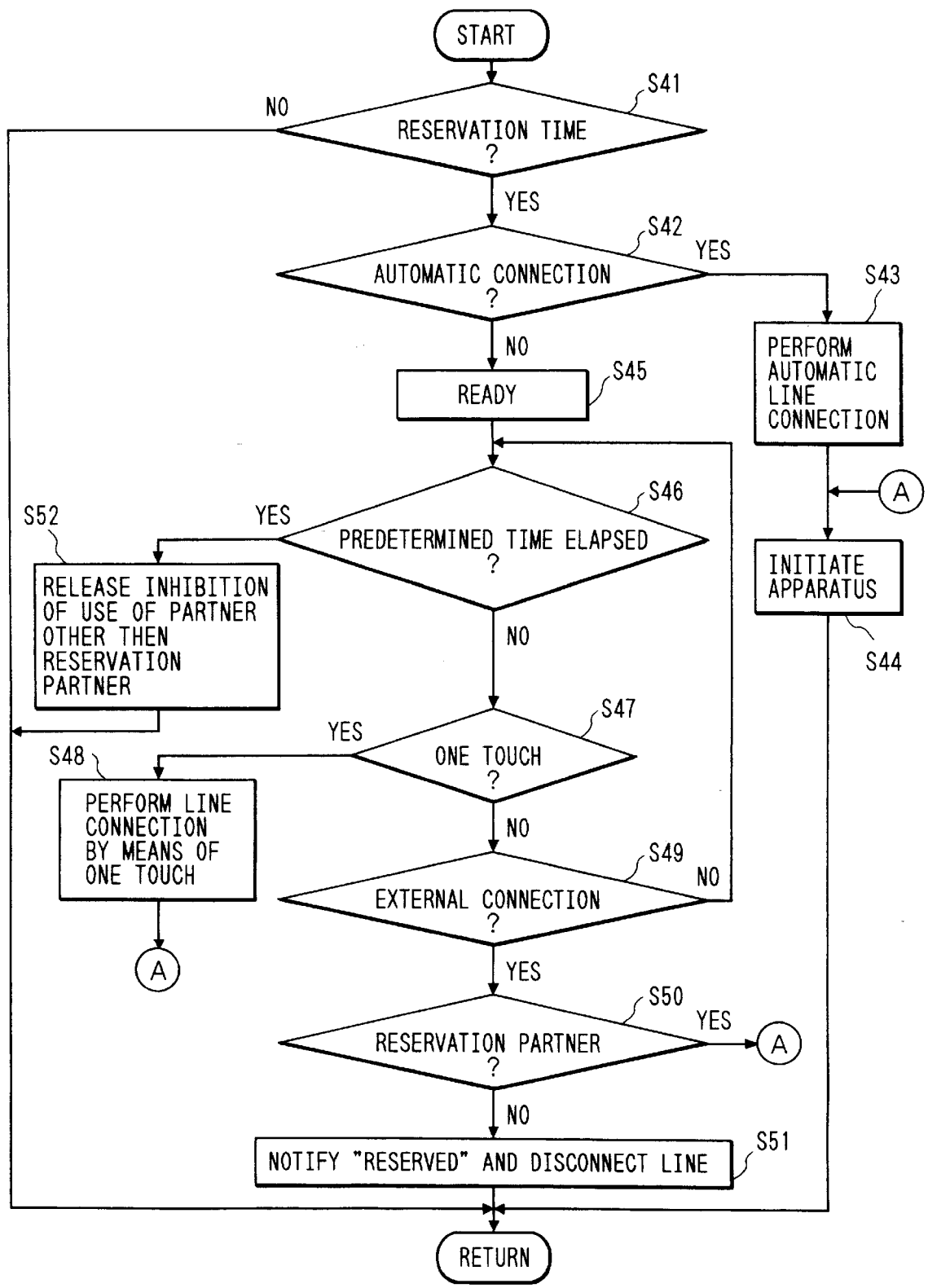
FIG. 7 is a flow chart showing a reservation control operation of the third embodiment according to the present invention.

Next the reservation time management operation of the third embodiment is described based on the flow chart shown in FIG. 7.

The system controller 107 judges whether there is a reservation of which the use reservation date of the self device has arrived based on the reservation registration file F1 and the timer 112 (step S41). As a result, if no reservation of which the reservation date has arrived is found, the process returns to the main flow shown in FIG. 6. If a reservation of which the reservation date has arrived is found, it is judged whether the reservation has been registered so as to perform an automatic line connection to an opposite communication partner to be reserved (step S42). As a result, if an automatic connection is registered, a line connection or an originating call is immediately performed without waiting for the operation of the console unit 109 (step 43). The television camera 101 and the monitor 102 in the self device are activated to arrange a teleconference (step S44), and then the process returns to the main flow.

On the other hand, if a one touch connection is registered instead of the automatic connection, it is possible to prepare a line connection to an opposite communication partner to be reserved in accordance with a one-touch operation (step S45).

The one-touch connection, for example, is performed by outputting the line number of the opposite communication partner to the transmit port in the line interface 115. Thus it is judged whether a predetermined period of time (till a time in a reservation period) has passed since a reservation date (or the starting time of the reserved period (step S46). As a result, if the predetermined period has not passed, it is judged whether there is the one-touch operation (step S47). If there is the one-touch operation, the opposite communication party's line number output on the transmit port is transmitted to establish line connection (step S48). Then the process proceeds to the step S44 to activate the system.

On the other hand, if there is no one-touch operation, it is judged whether there is a line connection to an external device (step S49). If there is a line connection to the external device, it is judged whether the external device is the opposite communication partner corresponding to the reservation of which the reservation date has arrived (step S50). As a result, the external device is the opposite communication partner corresponding to the above reservation, the process goes to the step S44 to activate the device. On the contrary, if the external device is not the opposite communication partner corresponding to the above reservation, the line is disconnected after the external device is informed that the system is in a reserved state (step S51). Then the process returns to the main flow. In the step S49, if it is judged that no line connection from the external device has been established, the process returns to the step S46, whereby it is again judged whether a predetermined period of time has passed. If the predetermined period of time has passed, the forbidden use of the system to other partners except the reservation partner are released (step S52). Then the process returns to the main flow.

In the third embodiment, when a reservation date has arrived, it is possible to selectively register either an automatic line connection or a line connection by a one-touch operation. Therefore, if the use at a reservation date is certain, an automatic line connection is registered, thus omitting problems due to the line connection. If the use at a reservation date is not certain, a one-touch line connection is registered, whereby if the device is in a usable state at the reservation date, the one touch operation can simplify the line connection, while if the device is not in a usable state at the reservation date, other partners except the reservation partner can use the system after a predetermined period of time has passed since the reservation date. Therefore the teleconference system according to the present invention can be effectively used. Since the registration such as a reservation is made in a conversational mode, even a person inexperienced in operation can simply register. Secret leaks to the third person can be presented because conference materials are accessible only by the persons whose line numbers are registered.

The present invention should not be limited only to the above embodiments. The present invention, for example, can be applicable to the teleconference system having all the functions described in the first to third embodiments.

As described above, the second and third embodiment can reserve a teleconference from a remote location via the LAN. This feature results in that it is not needed to go directly to the location of the teleconference device for a reservation; the teleconference can be certainly prepared in advance; and the teleconference line can be certainly kept by disconnecting the line connection from other partners other than a reservation partner at a reservation date.

The present invention has various advantages. When the reservation partner does not use the teleconference system after a predetermined period of time from a reservation date, partners except the reservation partner can use it even in the reservation period. Moreover, there is no fear that the secret of conference material leaks to the third person. Therefore the teleconference can be held smoothly and certainly.

As described above, the preferred embodiments according to the present invention has been described. However, the present invention should not be limited only to the above mentioned embodiments but it is possible to provide various modified embodiments in the scope of the present invention.

What is claimed is:

1. A teleconference system comprising:

input means for inputting image data and audio data;

output means for outputting image data and audio data;

communication means coupled between said input means and said output means, for communicating the input image data and audio data and the output image data and audio data;

reservation management means coupled to said communication means, for controlling a reservation time at which said teleconference system is used and for allowing a reservation partner to use said teleconference system when the reservation time has arrived, said reservation management means including an inhibit means for inhibiting partners other than said reservation partner from using said teleconference system when said reservation time has come;

notification means coupled to said reservation management means, for receiving from a communication partner's teleconference system a reservation table stored in the communication partner's teleconference system, said notification means notifying a user of said teleconference system contents of the reservation table received from said communication partner's teleconference system;

selection means coupled to said reservation management means, for selecting the reservation time controlled by said management means;

transmission means coupled to said reservation management means, for transmitting the reservation time selected by said selection means to said communication partner's teleconference system; and releasing means for releasing said inhibit means from inhibiting the use of said teleconference system when the reservation partner does use said teleconference system during a predetermined period of time after the reservation time has arrived.

2. A teleconference system according to claim 1, further comprising interface means coupled to said reservation management means, for connecting said reservation management means with an external device, and wherein said interface means is connected to said external device via a local area network (LAN).

3. A teleconference system according to claim 1, wherein said reservation management means outputs an audible sound and an image to inform said output means that a reservation completion time will come immediately.

4. A teleconference system comprising:

input means for inputting image data and audio data;

output means for outputting image data and audio data;

communication means coupled between said input means and said output means, for communicating the input image data and audio data and the output image data and audio data;

reservation management means coupled to said communication means, for controlling a reservation time to use said teleconference system and for allowing a reservation partner at which said teleconference system is used to use, and for inhibiting partners other than said reservation partner from using, said teleconference system when the reservation time has arrived, and releasing means for releasing said reservation management means from inhibiting the use of said teleconference system when the reservation partner does not use said teleconference system during a predetermined period of time after the reservation time has arrived.

5. A teleconference system according to claim 4, further comprising interface means for connecting to an external device, and wherein said reservation management means performs a reservation management of said teleconference system based on reservation information sent from said external device via said interface means.

6. A teleconference system according to claim 5, wherein said interface means is connected to said external device via a local area network (LAN).

7. A teleconference system according to claim 5, wherein said interface means is connected to said external device via an integrated services digital network (ISDN).

8. A teleconference system according to claim 4, wherein said reservation management means outputs an audio and an image to inform said output means that a reservation completion time will come immediately.

9. A teleconference system comprising:

input means for inputting image data and audio data;

output means for outputting image data and audio data;

communication means coupled between said input means and said output means, for communicating the input image data and audio data and the output image data and audio data;

reservation management means coupled to said communication means, for controlling a reservation time at which said teleconference system is used and for allowing a reservation partner to use said teleconference system when the reservation time has arrived, said reservation management means including preparing means for preparing a communication to an opposite device when the reservation time has arrived, said reservation management means further comprising automatic call generation means for automatically generating a call to the opposite device when the reservation time has arrived, wherein said preparing means sets a telephone number of the opposite device by correlating the telephone number with a one-touch dial key when the reservation time has arrived, and said preparing means provides an originating call to the opposite device when the one-touch dial key is depressed by the reservation partner; and selection means for selecting either one of the setting of the telephone number of the opposite device by said preparing means and the automatic call generation to the opposite device by said automatic call generation means.

10. A teleconference system according to claim 9, further comprising interface means for connecting to an external device; and wherein said reservation management means performs a reservation management of said teleconference system based on reservation information sent from said external device via said interface means.

11. A teleconference system according to claim 10, wherein said interface means is connected to said external device via a local area network (LAN).

12. A teleconference system according to claim 10, wherein said interface means is connected to said external device via an integrated services digital network (ISDN).

13. A teleconference system according to claim 9, wherein said reservation management means includes an inhibit means for inhibiting partners other than said reservation partner from using said teleconference system when said reservation time has come.

14. A teleconference system according to claim 13, further comprising releasing means for releasing said inhibit means from inhibiting the use of said teleconference system when the reservation partner does not use said teleconference system during a predetermined period of time after the reservation time has arrived.

15. A teleconference system according to claim 9, wherein said reservation management means outputs an audio and an image to inform said output means that said reservation completion time will come immediately.

16. A teleconference system comprising:

input means for inputting image data and audio data;

output means for outputting image data and audio data;

communication means coupled between said input means and said output means, for communicating the input image data and audio data and the output image data and audio data; and reservation management means for controlling a reservation time at which said teleconference system is used and for allowing a reservation partner to use said teleconference system when said reservation time has arrived; and setting means connected to said reservation management means, for setting a time for an alarm before a reservation completion time arrives, wherein said reservation management means informs said output means that the reservation completion time will arrive immediately, when the time set by said setting means arrives, and the time for the alarm set by said setting means is capable of being set at an arbitrary time by an operator of said teleconference system.

17. A method of operating a teleconference system comprising the steps of:

inputting image data and audio data;

outputting image data and audio data;

communicating the input image data and audio data and the output image data and audio data;

controlling a reservation time to use said teleconference system and allowing a reservation partner at which said teleconference system is used to use, inhibiting partners other than said reservation partner from using, said teleconference system when the reservation time has arrived by a reservation management means; and releasing said reservation management means from inhibiting the use of said teleconference system when the reservation partner does not use said teleconference system during a predetermined period of time after the reservation time has arrived.

18. A method of operating a teleconference system comprising the steps of:

inputting image data and audio data;

outputting image data and audio data;

communicating the input image data and audio data and the output image data and audio data;

controlling a reservation time at which said teleconference system is used and allowing a reservation partner to use said teleconference system when the reservation time has arrived by a reservation management means including a step of preparing a communication to an opposite device when the reservation time has arrived and a step of automatically generating a call to the opposite device when the reservation time has arrived, wherein said preparing step includes setting a telephone number of the opposite device by correlating the telephone number with a one-touch dial key when the reservation time has arrived, and said preparing step further includes providing an originating call to the opposite device when the one-touch dial key is depressed by the reservation partner; and selecting either one of the setting of the telephone number of the opposite device in said preparing step and the automatic call generation to the opposite device.

19. A method of operating a teleconference system comprising the steps of:

inputting image data and audio data;

outputting image data and audio data;

communicating the input image data and audio data and the output image data and audio data; and controlling a reservation time at which said teleconference system is used and allowing a reservation partner to use said teleconference system when said reservation time has arrived by a reservation management means; and setting a time for an alarm before a reservation completion time arrives, wherein said reservation management means informs that the reservation completion time will arrive immediately, when the set time arrives, and the time for the alarm is capable of being set at an arbitrary time by an operator of said teleconference system.

* * * * *

UNITED STATES PATENT AND TRADEMARK OFFICE
CERTIFICATE OF CORRECTION

PATENT NO. : 5,852,466

DATED : December 22, 1998

INVENTOR(S) : TAKAYUKI KOMINE ET AL.

It is certified that error appears in the above-identified patent and that said Letters Patent is hereby corrected as shown below:

ON THE TITLE PAGE:

[56] REFERENCES CITED

U.S. Patent Documents
    "Taktsuki" should read --Takatsuki--.

COLUMN 1

Line 21, "for" should be deleted.

COLUMN 2

Line 46, "take" should read --taken--.

COLUMN 3

Line 20, "and" should read --an--.
    Line 36, "convolves" should read --convolutes--.

COLUMN 4

Line 45, "convolves" should read --convolutes--.

UNITED STATES PATENT AND TRADEMARK OFFICE
CERTIFICATE OF CORRECTION

PATENT NO. : 5,852,466

DATED : December 22, 1998

INVENTOR(S) : TAKAYUKI KOMINE ET AL.

It is certified that error appears in the above-identified patent and that said Letters Patent is hereby corrected as shown below:

COLUMN 5

Line 14, "teleconference, by telephone" should read --teleconference by telephone,--.

COLUMN 6

Line 21, "for" should read --to--.

COLUMN 7

Line 49, "had" should read --has--.
    Line 58, "had" should read --hand--.

COLUMN 8

Line 53, "for" should read --except for--.

COLUMN 9

Line 43, "line" should read --a line--.

UNITED STATES PATENT AND TRADEMARK OFFICE
CERTIFICATE OF CORRECTION

PATENT NO. : 5,852,466

DATED : December 22, 1998

INVENTOR(S) : TAKAYUKI KOMINE ET AL.

It is certified that error appears in the above-identified patent and that said Letters Patent is hereby corrected as shown below:

<u>COLUMN 11</u>

Line 14, "comprising" should read --comprising:--.
Line 46, "comprising" should read --comprising:--.

Signed and Sealed this

Thirtieth Day of November, 1999

Attest:

Attesting Officer

Q. TODD DICKINSON

Acting Commissioner of Patents and Trademarks